US011102534B2

(12) United States Patent
Wu et al.

(10) Patent No.: US 11,102,534 B2
(45) Date of Patent: Aug. 24, 2021

(54) CONTENT ITEM SIMILARITY DETECTION

(71) Applicant: Microsoft Technology Licensing, LLC, Redmond, WA (US)

(72) Inventors: Xiaoxu Wu, Folsom, CA (US); Kirill Sergeyevich Lebedev, Novato, CA (US); Alexandros Ntoulas, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 16/203,986

(22) Filed: Nov. 29, 2018

(65) Prior Publication Data

US 2020/0177942 A1 Jun. 4, 2020

(51) Int. Cl.

| | |
|---|---|
| ***H04N 21/262*** | (2011.01) |
| ***H04N 21/466*** | (2011.01) |
| ***H04N 21/454*** | (2011.01) |
| ***G06F 16/28*** | (2019.01) |
| ***H04N 21/458*** | (2011.01) |
| ***G06F 16/2457*** | (2019.01) |

(52) U.S. Cl.

CPC . *H04N 21/26266* (2013.01); *G06F 16/24578* (2019.01); *G06F 16/285* (2019.01); *H04N 21/26241* (2013.01); *H04N 21/26275* (2013.01); *H04N 21/458* (2013.01); *H04N 21/4542* (2013.01); *H04N 21/4665* (2013.01)

(58) Field of Classification Search

CPC ......... H04N 21/26266; H04N 21/4665; H04N 21/4542; H04N 21/26275; H04N 21/458; H04N 21/26241; G06F 16/285; G06F 16/24578

See application file for complete search history.

(56) References Cited

U.S. PATENT DOCUMENTS

| | | | | |
|---|---|---|---|---|
| 2008/0102947 A1* | 5/2008 | Hays | A63F 13/79 | 463/31 |
| 2015/0135329 A1* | 5/2015 | Aghasaryan | H04L 9/3236 | 726/26 |
| 2019/0294692 A1* | 9/2019 | Zhao | G06F 16/285 | |
| 2020/0082019 A1* | 3/2020 | Allen | G06F 16/685 | |

* cited by examiner

*Primary Examiner* — Oschta I Montoya

(74) *Attorney, Agent, or Firm* — Hickman Becker Bingham Ledesma LLP

(57) ABSTRACT

Techniques for efficiently detecting similarity among electronic content items are provided. A vector is generated for each of multiple content items and is used to assign its corresponding content item to a group among multiple groups. A set of content items that is assigned to a particular group of the plurality of groups is identified. For each pair of content items in the set, a similarity score is generated and used to determine whether to classify the pair as similar to each other. Similarity data is updated if to identify the pair if it is determined to classify the pair of content items as similar to each other. The similarity data associates a first content item with a second content item. The second content item is prevented from being presented to a particular user for a period of time after the first content item is presented to the particular user.

20 Claims, 5 Drawing Sheets

CONTENT ITEM SIMILARITY DETECTION

TECHNICAL FIELD

The present disclosure relates to similarity detection in content items and, more particularly, in using a grouping technique to accelerate similarity detection.

BACKGROUND

Many content providers rely on content delivery systems to distribute their respective content items over computer networks to computing devices that are coupled to publisher systems. Some content providers intentionally copy other content providers' content items. Some content providers unintentionally copy their own or other providers' content items. In both instances, it important to detect such copying and notify the relevant parties. However, some content delivery systems manage millions of content items. Comparing each content item with each other content item in order to determine whether there are pairs of content items that are copies of each other requires significant time and computing resources.

Furthermore, "copying" might not include exact duplication. Instead, some content providers may vary text and/or some image characteristics of another content provider's content item when creating their own content items. Thus, performing a strict text and/or image comparison will not identify content items that are very similar to a particular content item that might be popular.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for detecting similar content items are provided. In one technique, a numeric vector is generated for each content item. A numeric vector represents content (e.g., text and/or an image) of the content item. Each content item is assigned to a group based on the content item's vector. Only content items assigned to a group are considered for determining similarity with each other. Once a set of content items is identified as similar to a particular content item, multiple actions may be performed, such as detecting fraud, preventing users from being presented with similar content items, and warning content providers about similar content items.

Embodiments improve computer technology in multiple ways. For example, using a grouping technique described herein, one or more similar content items to a particular content item may be performed in real-time or near-real time. As another example, digital fraud on a computer network may be detected and prevented.

System Overview

Figure 1:
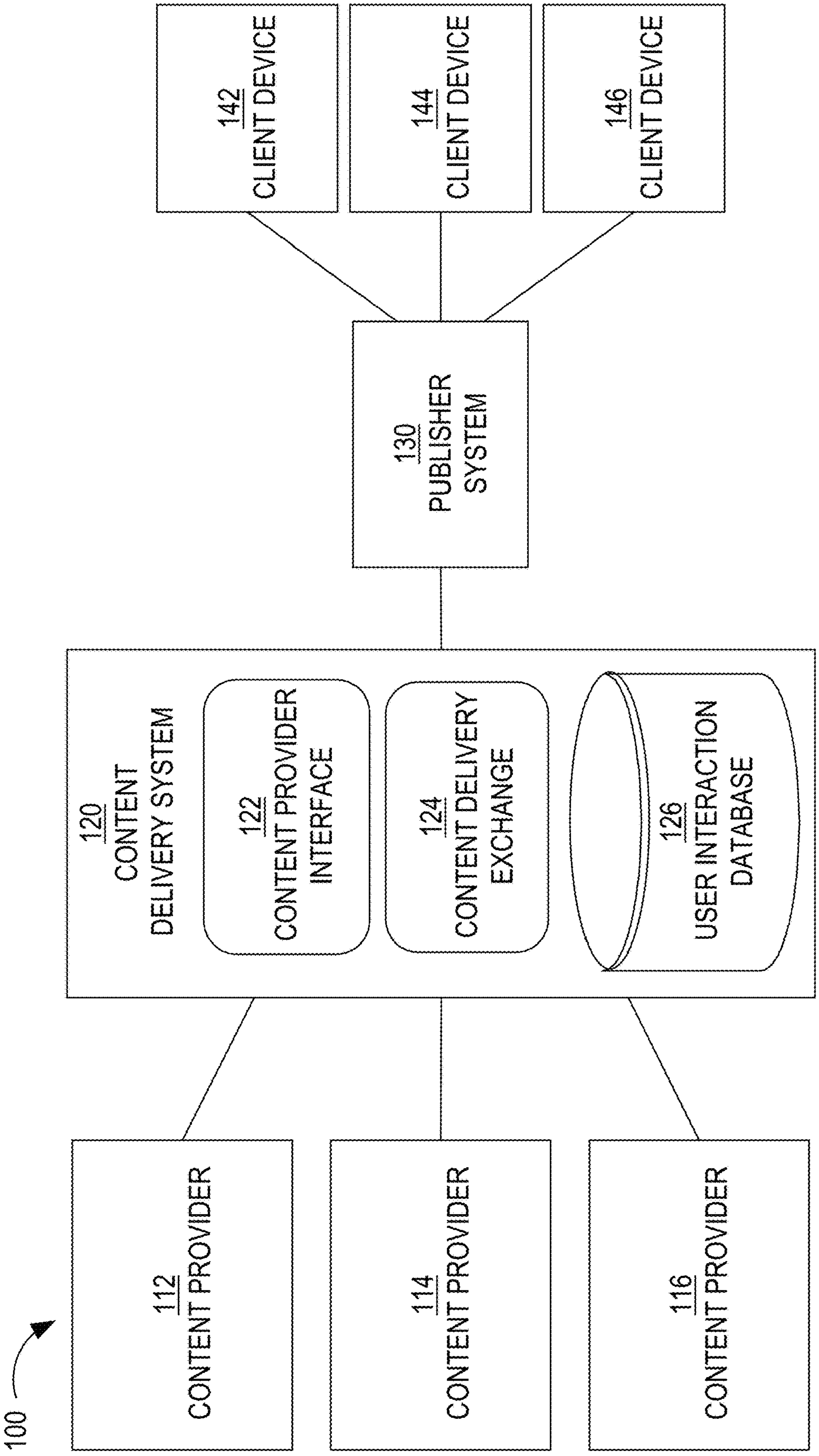
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item, or group of content items, is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item summaries, across client devices 152-156 (and other client devices not depicted). For example, content delivery system 120 determines whether a content item summary that content delivery exchange 124 delivers is presented at (e.g., displayed by or played back at) a client device. Such an "event" is referred to as an "impression." As another example, content delivery system 120 determines whether a content item summary that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 120 may calculate a CTR for the content item summary.

Content Item Similarity

Two content items are similar if they share multiple features in common. Two types of features include textual features and visual features. Example textual features include words or phrases in text, an ordering of words or phrases in text, and concepts or ideas indicated in the text. Example visual features include an image in the content item, orientation of any image in the content item, an arrangement of visual elements in a content item (e.g., text, followed by an image of certain dimensions, followed by more text), number of colors used in the content item, and visual aspects of the text, such as bolding, underlining, italicizing, font size, font type, font color, and indentation.

In embodiment, a similarity score is calculated for a pair of content items. The higher the similarity score, the more similar the pair of content items are to each other. A similarity score may reflect just textual similarity, just visual similarity, or both textual and visual similarity.

Any technique for generating a similarity score may be used. Embodiments are not limited to any particular technique.

Pereptual Similarity

In general similarity is not a well-defined term and usually is described in terms of editorial distance (e.g., number of different words in text) or similar metrics. This definition is not useful for content items. What is more important is people's perception of content similarity. Perceptual similarity is formalized as probability P of a person believing that two content items are similar (even though the content items might have completely different content) after presenting a first content item for an amount of time A (e.g., ten seconds) and presenting a second content item for the same amount time A after a period of time B (e.g., five minutes). For example, two content items are similar if the probability of a viewer marking them as similar after exposing them for ten seconds each (time A) with a five minute (time B) interval is greater than 0.7 (P>0.7). Though this probability is different per person, it can be assumed that the average probability is a good estimator of distribution.

Similarity Generation System

Figure 2:
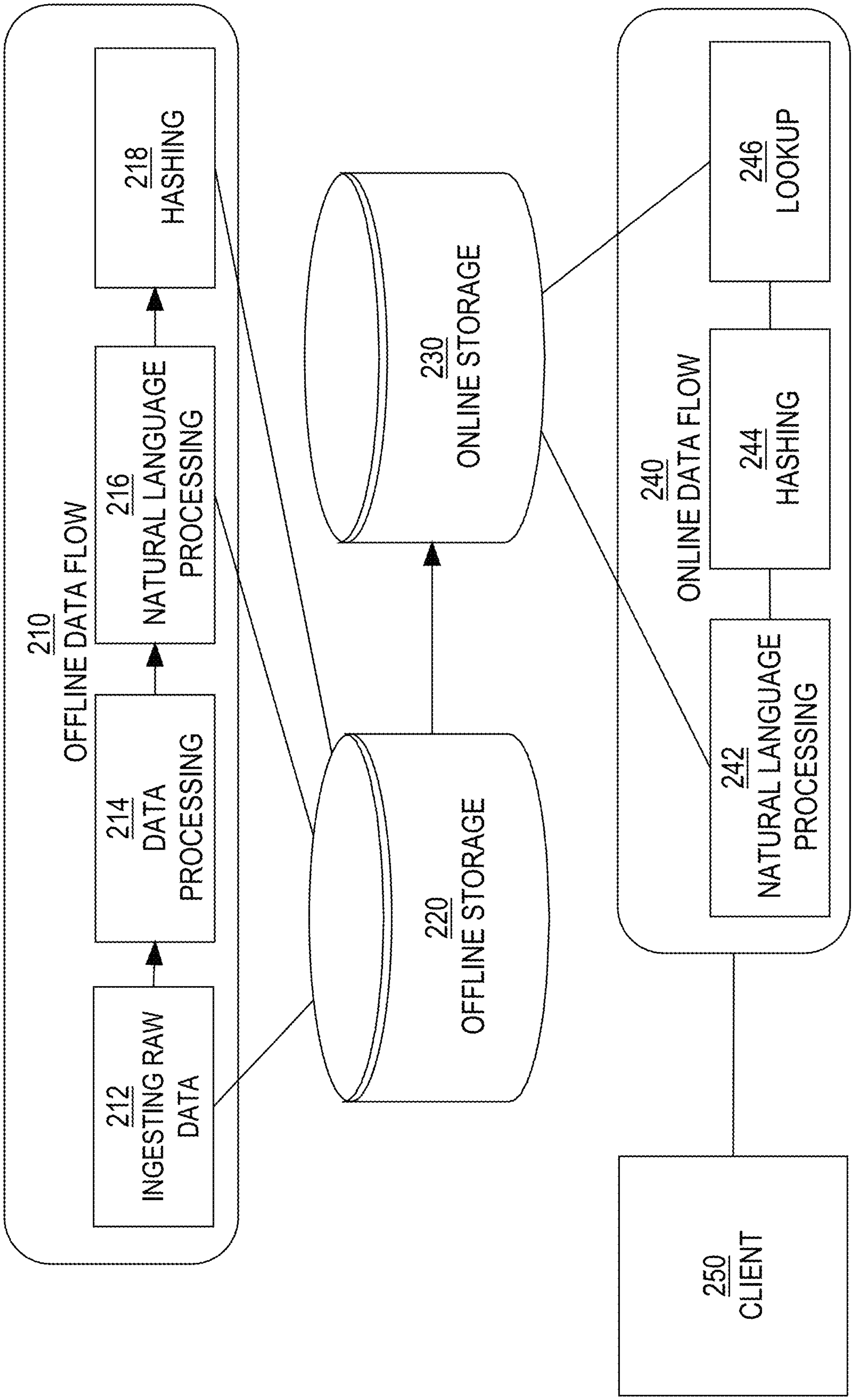
FIG. 2 is a block diagram that depicts an example similarity generation system, in an embodiment.

FIG. 2 is a block diagram that depicts an example similarity generation system 200, in an embodiment. Similarity generation system 200 comprises an offline data flow 210, offline storage 220, online storage 230, online data flow 240, and a client 250.

Offline data flow 210 comprises multiple steps, including ingesting raw data 212 (which involves reading data from offline storage 220), data processing 214, natural language processing 216, and hashing 218. Each of these steps may be performed by the same component or different components. Such component(s) is/are implemented in software, hardware, or any combination of software and hardware.

An example of offline storage 220 is a file system, such as a Hadoop Distributed File System (or HDFS). Apache Hadoop is a collection of open-source software utilities that facilitate using a network of many computers to solve problems involving massive amounts of data and computation. Apache Hadoop provides a software framework for distributed storage and processing of big data using the MapReduce programming model. Modules in Hadoop are often designed with a fundamental assumption that hardware failures are common occurrences and should be automatically handled by the framework. The core of Apache Hadoop consists of a storage part (HDFS) and a processing part, which is a MapReduce programming model. Hadoop splits files into large blocks, distributes them across nodes in a cluster, and then transfers packaged code into nodes to process the data in parallel. This approach takes advantage of data locality, where nodes manipulate the data to which they have access. This allows the dataset to be processed faster and more efficiently than it would be in a more conventional supercomputer architecture that relies on a parallel file system where computation and data are distributed via high-speed networking.

Offline storage 220 stores content items from multiple content delivery campaigns, including campaigns initiated by different content providers.

After ingesting raw data 212 is performed (i.e., a content item is read from offline storage 220), data processing 214 is performed, which involves performing one or more operations on text of the content item. Example operations include removing stop words (e.g., the, is, at, which, on), stemming, making all letters lowercase, and spelling corrections. Data processing 214 then tokenizes the remaining words. Tokening may refer to determining word boundaries. For example, any remaining abbreviations would be "cleaned up" or expanded. In non-English languages, tokenization might be more complex and can include conversion to canonical forms of words. For example, in Russian, while six forms of the same noun can be used depending on context, for NLP it is desired to convert such forms to a particular form. An analog in English is converting all past tense words into present tense.

NLP 216 involves converting each token (or word or phrase) into a vector of numeric values. Any technique for converting a token (or set of tokens) into a vector may be used. An example technique that may be used to generate word vectors is Word2vec, which is a group of related models that are used to produce word vectors (or "embeddings"). These models are two-layer neural networks that are trained to reconstruct linguistic contexts of words. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located in close proximity to one another in the space.

Word2vec may utilize either of two model architectures to produce a distributed representation of words: continuous bag-of-words (CBOW) or continuous skip-gram. In the CBOW architecture, the model predicts the current word from a window of surrounding context words. The order of context words does not influence prediction. In the continuous skip-gram architecture, the model uses the current word to predict the surrounding window of context words. The skip-gram architecture weighs nearby context words more heavily than more distant context words. CBOW is faster while skip-gram is slower but does a better job for infrequent words.

In an embodiment, the corpus that is used to train the models is all the text from all (or a subset) of the "known" content items, which may be stored in offline storage 220. Alternatively, a different corpus of words may be used, such as web pages from Wikipedia.

Regardless of which vector generation technique used, semantically similar words will map to vectors that are "close" to each other. One way to define "closeness" is through cosine similarity:

$$A \cdot B = |A||B|\cos(\theta) \rightarrow \frac{A \cdot B}{|A||B|} = \cos(\theta)$$

For example, "cat" has the vector [3, 4], "dog" has the vector [4, 4], and "LinkedIn" has the vector [8, 1]. Because the cat and dog vectors are close to each other in two-dimensional space, "cat" and "dog" are considered similar words, while "LinkedIn" is not considered similar to either "cat" or "dog."

In an embodiment, word vectors are generalized to sentences. A sentence vector is based on an aggregation of word vectors. An example aggregation includes identifying, for each entry in the sentence vector, the maximum of the corresponding entries of the word vectors. Another example aggregation includes, for each entry in the sentence vector, calculating the average or median value of the corresponding entries of the word vectors. Thus, similar sentences will have similar sentence vectors, similar to word vectors. Thus, text from a content item can be used to represent the entire content item as a vector, referred to herein as a content item vector. More similar content items in terms of text will have a higher (e.g., cosine) similarity measure.

NLP 216 stores word or sentence vectors (also referred to herein as "text vectors") in offline storage 220. Additionally or alternatively, NLP 216 sends the text vectors to hashing 218. For example, instead of storing the generated text vectors, NLP 216 sends the text vectors to hashing 218, which is responsible for storing the text vectors along with their corresponding hash values.

Grouping Similar Content Items

Because there are potentially millions of content items in offline storage 220, comparing (e.g., the text of) each content item to each other content item would take a significantly amount of time and computer resources (e.g., processor cycles). To address this issue, a hashing technique is used (and implemented by hashing 218) to quickly assign each content item vector to one of multiple groups or "buckets." It is presumed that all content item vectors that are assigned to the same bucket will have roughly similar vectors. The greater the number of buckets, the less dense each bucket will be (i.e., the average number of vectors per bucket will decrease) and, thus, the fewer comparisons will be performed per bucket. However, the greater the buckets, the more likely that two content item vectors that are similar are assigned to different buckets.

One example hashing technique is locality-sensitive hashing (LSH). LSH hashes input items so that similar items map to the same "buckets" with high probability (the number of buckets being smaller than the universe of possible input items). LSH differs from conventional and cryptographic hash functions because LSH aims to maximize the probability of a "collision" for similar items. LSH has much in common with data clustering and nearest neighbor search. Hashing-based approximate nearest neighbor search algorithms generally use one of two main categories of hashing methods: either data-independent methods, such as LSH, or data-dependent methods, such as locality-preserving hashing (LPH).

A hash generated by an LSH technique has a length n, where, initially, n random vectors $v_i$ are generated.

$$h_i = \text{sign}\ (v_i * x)$$

$$\text{lsh}(x) = (h_1(x), h_2(x) \ldots, h_n(x))$$

where x is vector for a content item, $h_i$ is function that produces a 0 or 1, and lsh(x) produces a vector of size n comprises 0s and/or 1s.

If $v_i$ is a normal vector (or "hashing vector") that describes a hyperplane and if x lies on the same side with the normal vector, then $h_i=1$; otherwise $h_i=0$. Hashing vector $v_i$ may have the same dimensionality as the content item vectors (e.g., x). Alternatively, hashing vector $v_i$ may have a different (e.g., smaller) dimensionality than the dimensionality of the content item vectors.

Figure 3A:
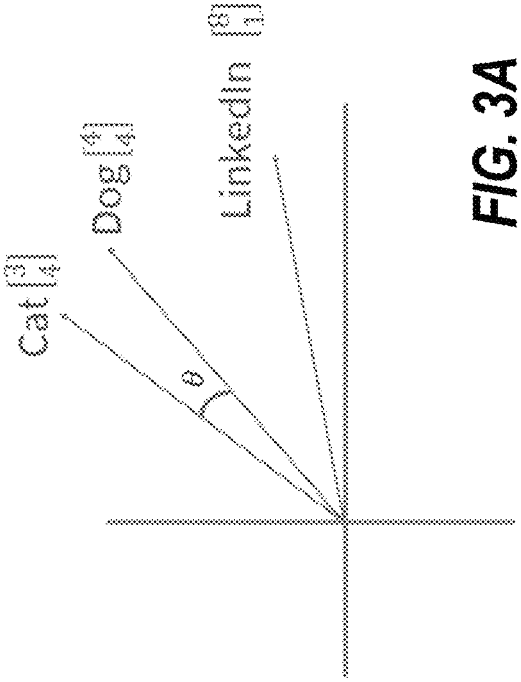
FIGS. 3A-3C are example graphs that illustrate how a hashing approach might work, in an embodiment.
Figure 3B:
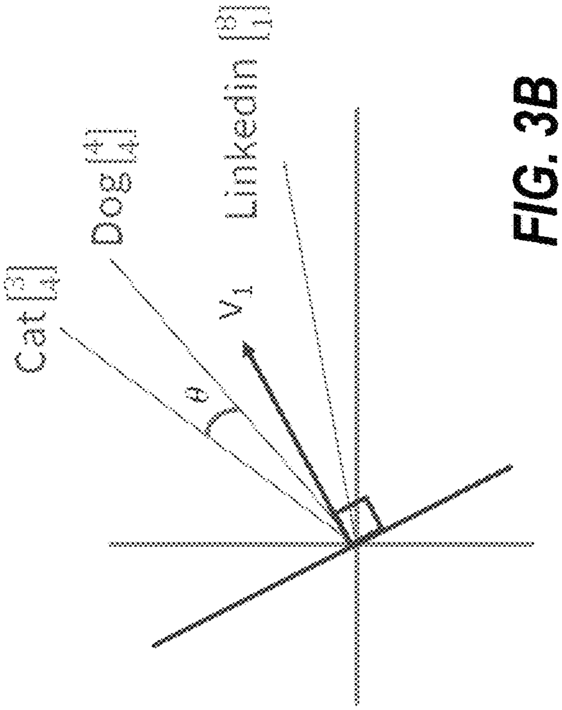
Figure 3C:
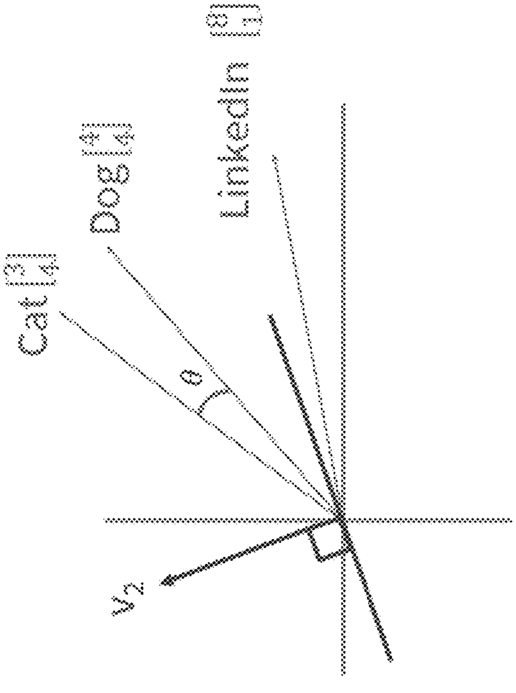

FIGS. 3A-3C are example graphs that illustrate how a hashing technique might work, in an embodiment. Each of FIGS. 3A-3C includes three two-dimensional word vectors: one for the word "Cat", one of the word "Dog" and one for the word "LinkedIn." In a real-world example, word or text vectors may be tens or hundreds of dimensions. Because the words "cat" and "dog" have similar meaning, their respective word vectors are more similar to each other than either is to the word vector for "LinkedIn."

FIG. 3B also includes a (e.g., random) hashing vectors $v_1$ while FIG. 3C includes a "hash" vector $v_2$. After FIG. 3B, but before FIG. 3C, the LSH vector for the word "cat" (which may be denoted lsh($V_{cat}$)) is (1, $h_2$), lsh($V_{dog}$)) is (1, $h_2$), and lsh($V_{LinkedIn}$)) is (1, $h_2$). Thus, the first hashing vector $v_1$ resulted each word being associated with the same first LSH bit. After FIG. 3C, lsh($V_{cat}$)) is (1,1), lsh($V_{dog}$)) is (1, 1), and lsh($V_{LinkedIn}$)) is (1, 0). Thus, if there are only two hashing vectors, the word "cat" and the word "dog" would be assigned to the same group or bucket while the word "LinkedIn" would be assigned to a different group or bucket.

One variation of LSH that may be used to assign content item vectors (or their corresponding content items) to buckets is super-bit LSH (SBLSH), which expands on random projection. SBLSH involves generating batches of normalized vectors that are perpendicular to each other. This is referred to as orthogonalizing vectors. SBLSH ensures lower variance within a bucket compared to the LSH approach, where higher variance means more false negatives.

Hashing is one approach for grouping similar content items. Clustering is another approach for grouping similar content item vectors. An example of clustering is k-means clustering.

In an embodiment, once a group of content items is determined (either based on a hashing approach or a clustering approach), all the content items in the group are automatically considered similar. Alternatively, a similarity score is generated for each pair of content items in the group. In this way, the groups are used to narrow the scope of the number of similarity scores that need to be generated. As noted above, cosine similarity is one way in which similarity between two content items may be computed.

In an embodiment, a threshold similarity score is defined such that, if a similarity score of a pair of content item vectors is above the threshold similarity score, then the corresponding content items are considered similar; otherwise, the corresponding content items are not considered similar. The threshold similarity score may be manually determined and adjusted.

Alternatively, the threshold similarity score may be determined automatically. For example, a prediction model is training based on multiple training instances, where each training instances includes a similarity score (e.g., a cosine similarity) for a pair of content items and a label indicating whether a human observer considered the pair of content items similar. The labels may be based on human labelers who are under the supervision of the entity employing the prediction model.

In an embodiment, the human-based labeling is based on perception. For example, for each human labeler, N content items are presented and then a particular time interval passes (e.g., five minutes), after which M content items are presented, some of which are the same as or similar to the N content items. Some human labelers may perceive a particular pair of content items as similar while other human labelers may not so perceive. Based on the training data, a majority of labelers may perceive that a first pair of content items are similar even though a text portion of the two content items are very dissimilar while a majority of labelers may perceive that a second pair of content items are not similar even though the respective text portions of the two content items are very similar or identical. This may mean that people in general are much more perceptive of image similarity than text similarity. Such a phenomenon may be reflected in the prediction model. For example, if the prediction model takes image similarity and text similarity as input, then there may be a higher weight on image similarity than on text similarity.

Additionally or alternatively, at least some of the labels may be based on users who view the content items presented through publisher system 130. Each content item presented through publisher system 130 (or on certain pages or presented in certain ways, such as through a feed) may be accompanied by a user interface element that, when selected, indicates that the content item is similar to a content item presented previously to the user. Selection of the UI element causes the client device operated by the user to transmit similarity data that identifies content item (that is adjacent to the UI element) and, optionally, user identification data (e.g., a member identifier, a browser identifier, an IP address, etc.) and/or time data. Because the previously presented content item may not be visible to the user anymore, content delivery system 120 (or an associated computer system) identifies, based on the user identification data and, optionally, the time data (in order to limit the number of content items to consider), a set of content items that were presented to the user previously. A content item vector for the "similar" content item may then be compared to each vector of each content item in the set of identified content items. The content item in the set with the highest similarity score is considered the previously presented content item and is used to create a training instance that includes the similarity score and a positive label (or a label indicating that two content items were considered similar).

In an embodiment, a training instance includes a time difference that indicates an amount of time that elapsed between the presentations of the two content items. If the time difference is 0, then that means the two content items were presented at the same time, e.g., on the same web page concurrently or in the same content item feed concurrently. The value of the time difference feature may be in seconds, minutes, hours, or any other time unit.

One set of training instances may be used to training the prediction model and another set of training instances may be used to validate the prediction model. A threshold prediction value may be manually or automatically chosen to ensure maximum recall, maximum precision, or a balance between recall and precision. Future output values from the prediction model will be compared to the threshold prediction value. For example, if an output value is greater than the threshold prediction value, then the corresponding content items are considered similar to each other.

Hashing 218 stores computed hash values in offline storage 220. For example, hashing 218 causes each text vector (and/or an identifier for the corresponding content item) that is associated with a particular hash value to be stored, in offline storage 220, in association with each other. For example, a hash value may map to a particular entry in hash table, where each entry in the hash table is associated with a linked list or an array of content item identifiers that map to that entry and, optionally, each entry in the hash table includes (or is otherwise associated with) the text vector of the content items that map to that entry.

Optimizing Buckets

In an embodiment where LSH (or SBLSH) buckets are used, the bucket size may be optimized. In one experiment, a set of (e.g., all or most) content items is split into smaller mutually exclusive groups of content items that are perceptually similar. Those groups are referred to as the "ground truth groups." Ground truth groups are labeled in a more or less manual fashion, as they rely upon human perception. The method of experimentation may be assisted by a special tool that presents content items to a human user in a realistic fashion, presenting the content items for a predetermined amount of time, and then cycling between the content items. Afterwards, the human user is presented another group of content items (some the exact same as before, some "similar" as identified by similarity generation system 200, and some completely different) and is asked whether s/he has seen the content item before. This tool may be used for multiple human users in order to come up with group truth groups.

Once the ground truth groups are established, the same set of content items is processed by similarity generation system 200, which eventually produces buckets that contain what the system "believes" are similar content items (which will be different from the results derived from the experiment). In one technique, the buckets produced by similarity generation system 200 are compared with the ground truth groups. If the produced buckets are not very similar to the ground truth groups, then the bucket size may be increased or decreased (e.g., through modifying super-bit generation parameters which has an indirect effect on bucket size) to optimize for accuracy.

For example, LSH is used to assign each of one million content items to one of multiple buckets. Each bucket is associated with its own number. If, for example, a three numbered hash vector is used and each hash vector component is limited to an integer between 0 and 9, then numbers from 000 to 999 are used to represent bucket numbers. (A hash value may be represented as a tuple of integers: (1) given an LSH hash: 0010 1110; (2) consider each chunk of 4 bits as an integer: [0010, 1110] becomes [2, 14]; (3) hash the integer with h(x, b)→[0, b-1], which is a hash function that maps any integer to a non-negative integer less than b; for example, if h(x, b)=(x*LARGE_PRIME) % b and b is 10, then [hash(2, 10), hash(14, 10)]→[3, 5].) In this case, there are only one thousand buckets available and the average number of content items per bucket would be one thousand. The hash vector size (or hash length) and/or the numbers available for each hash vector component may be varied. Such a variation will affect how well content items assigned to the same bucket are aligned in terms of perceptual similarity. A validation dataset may be collected from users/labelers to ensure that bucketing achieves this goal.

In an embodiment, multiple combinations of hash vector size and numbers available for each hash vector component are tried to determine one or more metrics for each combination. Example metrics include precision, recall, AUC (area under the ROC (receiver operating characteristic) curve), and percentage of perceptually similar pairs that are assigned to the same group or hash bucket. In one variation, a required performance is specified prior to an experiment involving a particular combination of hash vector size and numbers available and the experiment satisfies the required performance. In another variation, a grid search method is applied where the two variables are varied with a predefined increment. For example, the hash vector size is varied from 3 to 10 (in +1 increments), and "available numbers" is varied from 9 to 50; thus, there would be a total of 336 combinations. Each of these combinations is compared (using an automated approach) to find the one that best optimizes one or more performance metrics.

Cold Start Scenario

Content providers may be constantly creating new content delivery campaigns through content provider interface 122 and, accordingly, uploading new content items all the time. Instead of comparing each new content item with each other content item in a content item database, a hash value is generated for the new content item and the hash value is used to look up a bucket (or group) of content items. In this way, similar content items may be identified much faster, whether the entire of bucket of content items are presumed to be similar to the new content item or a similarity score is computed for each content item in the bucket relative to the new content item. Therefore, embodiments herein allow for the relatively fast identification of similar content items of a new content item.

Checking Related Buckets

In the embodiment where an LSH technique is used to assign content item vectors to buckets, one or more of the generated vectors $v_i$ that define a hyperplane may "split" two content item vectors that are otherwise quite similar (e.g., as defined by cosine similarity). Because the two content item vectors would be assigned to different buckets, a similarity score between the two content item vectors would not be generated.

In an embodiment, each of one or more vectors in a bucket is compared to vectors in one or more other buckets. For example, each bucket is defined by a hash value, which is a series of 0s and 1s. Given a first bucket's hash value, a single bit (e.g., the first bit) in the hash value is modified (e.g., from 0 to 1 or vice versa) and the modified hash value is used to identify a second bucket that corresponds to that modified hash value. Then, each of one or more content item vectors in the first bucket is compared to each of one or more content item vectors in the second bucket. This process may repeat for each bit in the first bucket's hash value. Thus, if a hash value consists of twenty bits, then, given a content item vector in a particular bucket, twenty other buckets are considered for generating similarity scores between the content item vector and content item vectors associated with the twenty other buckets.

Online Data Flow

As noted previously, similarity generation system 200 includes online data flow 240 and client 250. Online data flow 240 is included for use cases where one or more content items are not already hashed. For example, in case of a new content item (e.g., that a content provider uploads to content delivery system 120 through content provider interface 122), such a content item has not yet been processed; thus, the new content item is hashed to identify whether there are any similar content items already in the system.

Offline storage 220 transmits text vectors (and, optionally, similarity scores and/or hash values) to online storage 230. Such a transmission may be performed in response to a request from online storage 230. Transmission of text vectors may be performed regularly, such as daily, especially if new content items are uploaded to content delivery system 120 constantly or if one or more associated prediction models are updated or if the similarity score computation changes.

Client 250 may be part of content delivery system 120. For example, an administrator may operate client 250 to identify content items that are similar to a particular content item. As another example, client 250 is part of content delivery exchange 124 and calls online data flow 250 to identify one or more content items that are similar to a particular content item, such as one that is recently created or uploaded by a content provider or that is identified as targeting a particular user that initiated a current content item selection event.

Online data flow 240 includes NLP 242, hashing 244, and lookup 246. Content of a (e.g., new) content item is analyzed by NLP 242, output from NLP 242 (e.g., word vectors or sentence vector) is input to hashing 244, output (or hash) of hashing 244 is used by lookup 246 to identify, from online storage 230, content item(s) that are assigned to the same (and, optionally) similar bucket as the bucket associated with the same output. Lookup 246 returns the identified content item(s) (if any) to client 250. NLP 242 may generate the word/sentence vector(s) or may send words/tokens of the extracted content to offline storage 220, which returns the corresponding word vectors. If NLP 242 receives, for a particular content item, multiple word vectors from offline storage 220, then NLP 242 may generate a sentence vector based on the received word vectors.

Example Process

Figure 4:
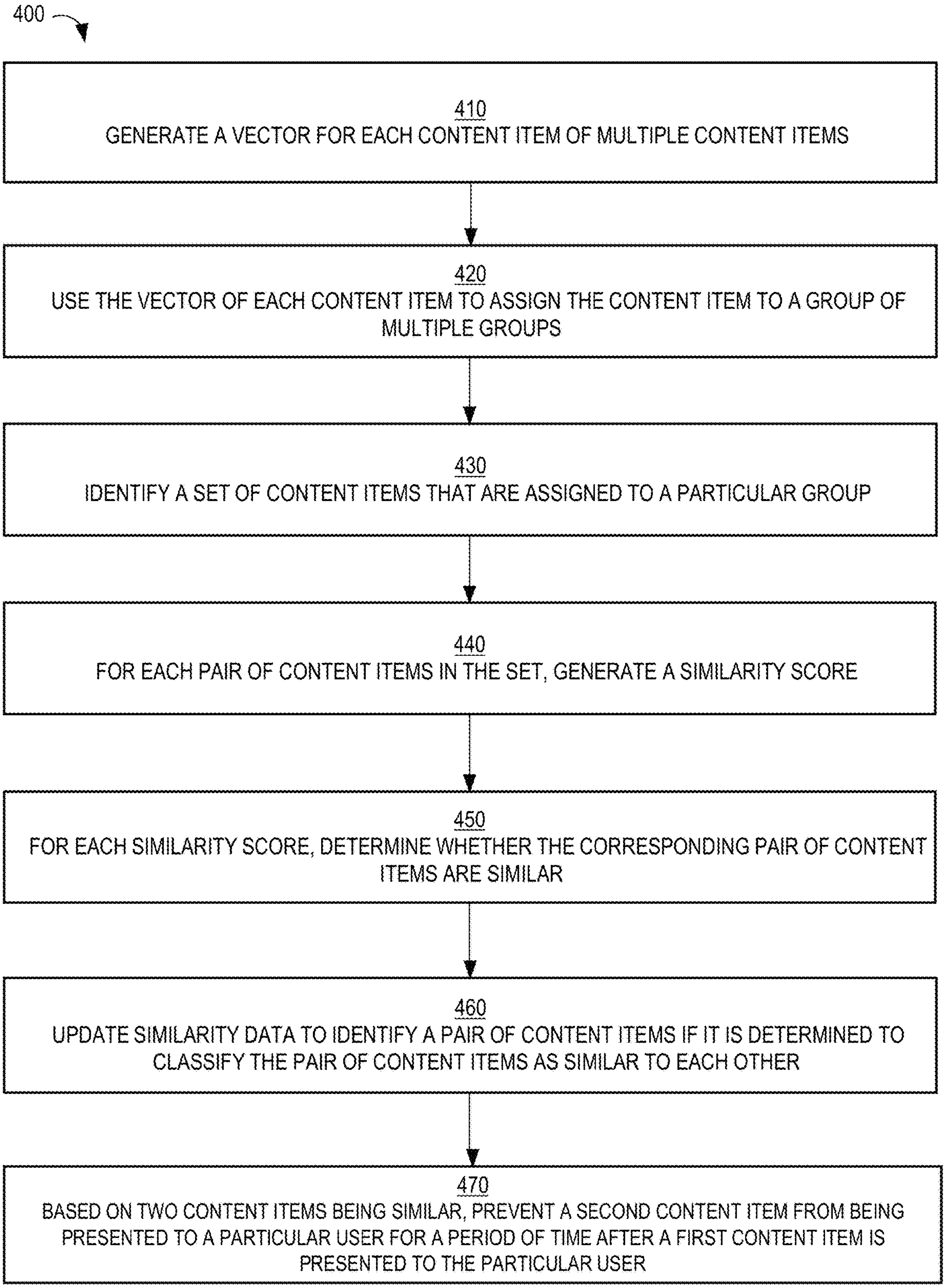
FIG. 4 is a flow diagram that depicts an example process for identifying and processing similar content items, in an embodiment.

FIG. 4 is a flow diagram that depicts an example process 400 for identifying and processing similar content items, in an embodiment. Process 400 may be performed by content delivery system 120 and/or related systems.

At block 410, a vector is generated for each content item of multiple content items. A vector comprises multiple entries, each containing a numeric value, such as a floating point number.

At block 420, the vector is used to assign each content item to one of multiple groups. Similar vectors are assigned to the same group. One technique for determining similar vectors is through LSH.

At block 430, a set of content items that is assigned to a particular group of the plurality of groups is identified. Block 430 may be performed for each group that includes at least two content items.

At block 440, for each pair of content items in the set of content items, a similarity score is generated. Thus, if there are five content items in the particular group, then there are ten pairs of content items and ten similarity scores are generated, one for each pair. An example similarity score is cosine similarity.

At block 450, based on the similarity score, it is determined whether the pair of content items should be classified as similar to each other. For example, if the similarity score is above a particular pre-defined threshold, then the pair of content items are classified as similar; otherwise, the pair of content items are not classified as similar. The threshold may be defined manually or automatically based on, for example, a prediction model.

At block 460, similarity data is updated to identify the pair of content items if it is determined to classify the pair of content items as similar to each other. At least one pair of content items are classified as similar to each other. Similarity data may comprise a list of pairs of content items. Alternatively, each content item is indexed, such that an index entry for each content item includes a list of zero or more content items. Alternatively, a database of content items includes a record for each content item and the record is updated to include a list of zero or more content items that were classified as similar to the corresponding content item.

At block 470, a second content item is prevented from being presented to a particular user for a period of time after a first content item is presented to the particular user. For example, content delivery system 120 keeps track, for each user, of content items that have been presented to the user. Each previously-presented content item may be associated with a list of zero or more content items that are considered similar to the previously-presented content item. Additionally, if there are multiple previously-presented content items that are associated with such a list, then those lists may be aggregated or combined to generate a single list of content items that should not be presented to the user. After the lapse of a certain amount of time, one or more of the content items in the list(s) may be removed so that they may be presented to the user in the future. Alternatively, some of the content items in the lists may be prevented from ever being presented to the user because the user previously provided input that the user does not want to view any content items that are similar to a particular content item for the indefinite future.

Visual Similarity

In an embodiment, a visual similarity score is generated. As noted above, visual similarity score may be generated in addition to or instead of a textual similarity score. The visual features of a content item may be represented numerical in one of a number of ways. For example, each content item includes a feature vector comprises multiple entries, one for each possible visual feature that a content item might include. Each entry in the feature vector includes a 1 or 0; 1 indicating that the content item includes that visual feature, 0 indicating that the content item does not include that visual feature. As another example, a feature may have multiple possible values, such as the dominant color in an image of a content item. The number of possible values to represent that dominant color may be 8, 256, or 3 million.

Another way to represent visual features of a content item is through image vectors. In an embodiment, if a content item includes an image, then an image vector is generated. An image vector may be generated using one or more techniques, an example of which is using a convolutional neural network (CNN) that is trained on many images. An example of a CNN is VGG-19, which CNN is 19 layers deep and can classify images into hundreds of object categories.

Instead of considering one or more object categories that might be output by a neural network based on an input image, embodiments only consider a vector that is output, such as a 4,096 dimension vector that VGG-19 outputs and is used to classify the input image. A vector that is output from a machine-learned model, such as a CNN, is referred to herein as an "image vector."

In an embodiment, an image vector is processed using a grouping technique (such as SBLSH). Thus, for each available content item that includes an image, an image vector is generated based on the image and the image vector is assigned a bucket (or group) using multiple vectors $v_i$.

In an embodiment where a CNN is trained, output from an intermediate layer of the CNN is used rather than output from the output (or final) layer of the CNN. The output (or final) layer of the CNN produces a vector that encodes labels with probabilities, whereas earlier layers produce vectors that can more reasonably be used for cosine similarity. Changing from which layer to use output from the CNN (e.g., fc1 or fc2 layer) can have an effect on the LSH clusters/buckets. The choice regarding from which CNN layer to obtain output can be optimized for a metric, such as minimizing the error between the LSH clusters and the ground truth groups.

Text and Image Vectors

In an embodiment, a text vector and an image vector are generated for each content item. Text and image vectors may be processed in at least two main ways.

In one embodiment, a content item's text vector and image vector are combined (e.g., concatenated) prior to assigning the content item to a group. For example, a text vector of a content item and an image vector of the content item are concatenated to generate a combined vector for the content item. A hash value is computed based on n (e.g., random) vectors $v_i$ and the content item is assigned to a bucket that is associated with the hash value. Thus, both text and image vectors are used to assign a content item to a single group.

In another embodiment, two sets of groups (e.g., buckets) are maintained: one for text vectors and another for image vectors. Thus, each content item is assigned to two groups: one text-associated group and one image-associated group. There are multiple text-associated groups and multiple image-associated groups. The same vectors $v_i$ may be used to create a hash for text vectors and image vectors. Alternatively, one set of vectors $v_i$ may be used to create a hash for text vectors and a different set of vectors $v_i$ may be used to create a hash for image vectors.

In this latter embodiment, when identifying content items that are similar to a particular content item that is assigned to a text-associated bucket and to an image-associated bucket, a first set of content items are identified based on the text-associated bucket and a second set of content items are identified based on the image-associated bucket. The first set of content items may be union with the second set of content items. For example, it is presumed that content items in the union of both sets are similar. Alternatively, for the particular content item, a similarity score is generated between the particular content item and each content item in the union.

Alternatively, an intersection of the first set and the second set is determined. Thus, only content items that are found in both the first set and the second set are considered for similarity. For example, it is presumed that content items in both sets are similar. Alternatively, for the particular content item, a similarity score is generated between the particular content item and each content item in the intersection.

In an embodiment, a prediction model is trained based on both text vector similarity and image vector similarity. The training data may comprise a text vector similarity score for a pair of content items, an image vector similarity score for the pair of content items, and a label indicating whether the pair of content items are considered similar to each other.

Updating Content Item Vectors

In an embodiment, a model that is used to generate a text vector or a word vector is updated. Such an update may occur regularly, such as daily or weekly, or in response to certain events, such as an increase of 5% of new content items to a content item database or receiving a certain amount of negative user feedback over a period of time. For example, a Word2vec model may be retrained based on a different text corpus, which may include at least a portion of the previous text corpus that was used to train a previous version of the Word2vec model. For example, text from "new" content items (e.g., that were received from content providers since the most recent training of the model and, thus, were not included in the previous text corpus) are added to the text corpus and/or text from "old" content items (i.e., that were included in the previous text corpus) are removed from the text corpus. Because the text corpus is updated, a new version of the model is trained and a text vector for each (e.g., current or active) content item is generated based on the new version. Thus, for many content items, a current text vector for a content item may contain different values than a previous text vector for that content item.

Use Case: Removing Similar Content Items

Determining that two or more content items contain similar content may be used in one or more ways. For example, a user may provide input that indicates that the user does not wish to be presented with a content item that is being (or was) presented to him/her. The input may be received in one or more ways, such as a selectable option that is displayed adjacent to the content item. The selectable option may appear when certain input is received relative to the content item, such as a right click or clicking a particular icon adjacent to the content item. The selectable icon may be part of the content item, such that the selectable icon is provided by content delivery system 120. Alternatively, the selectable icon may be provided by publisher system 130.

In response to user selection of the selectable option, report data is generated (e.g., at the client device that the user is operating) and sent to content delivery system 120. The report data includes (1) a content item identifier that identifies the content item, (2) identification data that identifies the user (e.g., a user identifier) and/or the client device (e.g., a MAC address, an IP address, or a cookie identifier), and (3) action data that indicates that the user does not wish to see the content item and/or similar content items. (In a related embodiment, identification data is not collected or included in report data.) In an embodiment, there are at least two selectable options for a presented content item: wishing to not see the content item again and wishing to not see similar content items again (which may include the content item itself). Content delivery system 120 stores the report data for later processing.

When content delivery system 120 (or an affiliated computer system) processes the report data, the content item identifier included in the report data is used to look up content items that are similar to the content item. For example, each content item identifier is associated with a group identifier or a bucket identifier that is associated with a list of zero or more other content items. The resulting list of "blocked" content items are stored in association with the user so that content delivery system 120 ensures that the user will not be presented with any of the content items in the list in the future. In a related embodiment, a content item group identifier uniquely identifies a group of similar content items. The content item group identifier may be associated with the user (e.g., in a profile of the user) instead of the list of blocked content items, which may change from time to time.

In an embodiment, each user is associated with a list of content delivery campaigns (or content items) that target the user. A list of blocked content items (i.e., that are similar to a content item that a particular user wished to not see again) is compared to the list of content delivery campaigns. If there is a match with a particular content delivery campaign, then that particular content delivery campaign is removed from the list of content delivery campaigns. Later, when content delivery system 120 receives a content request initiated by the user, the list of content delivery campaigns associated with the user will not include any content delivery campaigns that were removed based on report data associated with the user.

In a related embodiment, each content delivery campaign is associated with a list of users (e.g., in the form of user identifiers) to which the content delivery campaign targets. The list of users may be indexed to allow for quick identification of all content delivery campaigns that are associated with a particular user. If the list of content delivery campaigns includes a content delivery campaign that matches a content item identifier in the list of blocked content items, then the corresponding user is removed from the list of users.

Use Case: Avoid Showing Similar Content Items

In a similar use case, content delivery system 120 or publisher system 130 may desire to present a variety of content items to users that visit publisher system 130. Thus, these systems may desire to avoid showing similar content items close to each other in both time and space. For example, content delivery system 120 implements a rule that a similar content item will not be presented to a user in the same instance of a content item feed that is presented to the user. As a similar example of a spatial-based rule, a rule is that no content item will be presented within four slots of a similar content item in a content item feed. As another example of a spatial-based rule, a rule is that no two similar content items will be presented on the same web page. As another example of a spatial-based rule, a rule is that a similar content item will not be presented on the same web page or an immediate subsequently-accessed web page (e.g., from the same domain as the original content item). As an example of a time-based rule, a rule is that a content item (that is similar to another content item that was presented to a user) is not presented to the user within two hours of the other content item.

In an embodiment, content delivery system 120 keeps track of which content items were presented to a user and identifies, for each content item that was presented to the user, a list of content items (or content delivery campaigns) that are similar to the content item. Each presented content item may be associated with time data and/or a spatial data that is used to determine whether or when a candidate content item that is in one of the lists may be presented to the user, depending on one or more presentation rules. For example, if a candidate content item is similar to a presented content item and the time data and/or spatial data associated with at least one rule is not satisfied, then the candidate content item is no longer a candidate for that user at that time. That content item may be a candidate later. As a specific example, if a candidate content item is similar to a presented content item and over two hours has passed since the presented content item was presented to the user, then the candidate content item remains a candidate and may ultimately be presented to the user. As another specific example, if a candidate content item for a current slot in a content item feed is similar to a presented content item that was presented in a previous slot in the content item feed and there are at least four slots between the current slot and the previous slot, then the candidate content item remains a candidate and may ultimately be presented to the user in the current slot.

After selecting multiple content items for presentation to a user, content delivery system 120 may maintain a long list of content items that should not be presented to the user. Each content item (or set of content items) in the list may be associated with rule data that indicates one or more restrictions on presenting the content item (or any in the set) to the user.

A user's list of "forbidden" content items may be processed regularly (e.g., every minute) or in response to certain input, such as a new content item selection event that involves the user. The process may check to see if any associated restrictions of a "forbidden" content item are still applicable. If not, then that content item may be removed from the list and, therefore, may be a candidate content item in future content item selection events. For example, if a certain time period has elapsed for a forbidden content item, then a time restriction associated with that content item is removed, which may be reflected in updating restriction data associated with the list or with that content item in the list. There may be one or more spatial-based restrictions that are still applicable. If there are no restrictions remaining for a content item, then the content item may be removed from the list.

In an embodiment, the similarity score between two content items dictates how long to wait to present one of the two content items after presenting the other content item. For example, the lower a similarity score between two content items (i.e., the more dissimilar two content items are), the sooner in time the two content items may be presented to the same user. Conversely, the higher a similarity score between two content items (i.e., the more similar two content items are), the longer the wait before the second content item can be presented to a user after the first content item is presented to the user. Thus, different content items in a list of forbidden content items (for a particular user) may be associated with different time data that indicates when the corresponding content items may be presented again to the particular user.

Use Case: Estimate Future Performance of a Content Item

In an embodiment, future performance of a particular content item is estimated based on actual performance of content items that are considered similar to the particular content item. Example performance metrics include number of impressions, number of user selections (e.g., clicks), user selection rate (e.g., CTR), number of other types of actions performed (e.g., filling out a form with personal information, visiting a third-party website, subscribing to a newsletter, downloading an application, making a purchase), spending a total resource allocation (e.g., total allocated budget), and spending a resource allocation regularly (e.g., spending a daily budget consistently).

For example, the most similar content item of a particular content item is identified (e.g., based on a similarity measure). Any performance metrics of that most similar content item are used as an estimation of the performance of the particular content item.

As another example, an average or median of all values of a performance metric of content items that are similar to a particular content item is determined and used as the estimated performance for the particular content item. The content items that are similar to the particular content item may be limited to ones that have a similarity measure with the particular content item above a particular minimum threshold.

As a similar example, a weighted average of performance values of similar content items is calculated for a particular content item and used as the estimated performance for the particular content item. The performance values of content items that are most similar to the particular content item are weighted higher than the performance values of content items that are less similar to the particular content item. In this example, different content items may have different similarity measures/scores with respect to the particular content item. Any technique for weighting actual performance values may be used.

Use Case: Detect Fraud

In an embodiment, similar content items are used to detect potential unauthorized copying or fraud. A content item may be classified as potential fraud if the similarity score with another content item (that was uploaded to content delivery system 120 previously) is above a particular pre-defined threshold.

In a related embodiment, similar content items are used to detect potential inappropriate content. A content item may be classified or flagged (e.g., by a user of content delivery system 120 or by an administrator thereof) as inappropriate. Examples of inappropriate content include political content, content about dating, or any other content that violates the policy of content delivery system 120, publisher system 130, and/or other publisher systems. Once such a content item is identified, similar content items are also identified, for example, by identifying other content items assigned to the same bucket as the identified content item that have a similarity score with the identified content item above a particular similarity threshold. This approach helps to localize mass spam attacks.

In a related embodiment, each pair of content items may have multiple similarity scores generated and if any one of them is above a particular threshold, then one of the content items in the pair (e.g., the newer one) is considered potential fraud. For example, for a particular pair of content items, a similarity score based on their respective text vectors (or "text similarity score") is generated and a similarity score based on their respective image vectors (or "image similarity score") is generated. If the text similarity score is over a particular threshold, then potential fraud is detected, even though the image similarity score is below the same or different threshold. Thus, one content provider may copy the text of another content provider's content item but use a very different image. Conversely, one content provider may copy the image of another content provider's content item but use very different text.

Also, similarity scores based on different aspects of a content item may be associated with different threshold values. For example, a first fraud threshold may be used for text similarity scores while a second fraud threshold may be used for image similarity scores.

If a content item is determined to be potential fraud, then the content provider of the content item may be notified using one or more techniques. Additionally or alternatively, a fraud score of the content provider may be increased. Content delivery system 120 may use the fraud score to determine whether to accept or activate content delivery campaigns created or initiated by the content provider.

One or more techniques may be used to determine which content provider is committing potential fraud. For example, the content provider that uploaded the (similar) content item to content delivery system 120 the latest is presumed to be the party potentially committing fraud. As another example, the content provider that has interacted with content delivery system 120 the longest is presumed innocent. As another example, the content provider that has been certified (e.g., by an internal process or a third party) or otherwise satisfies certain criteria (e.g., amount of dollars spent with content delivery system 120 is above a threshold) is presumed innocent. As another example, the content provider that has committed the most recent potential fraud or has committed the most potential fraud in the past is presumed to be the party potentially committing fraud (again).

Use Case: Notify Content Providers of Similarity

In an embodiment, a content provider that uploaded a first content item that is deemed similar to a second content item that was uploaded previously is notified that the first content item is similar. Such a notification may indicate whether the second content item is from the same content provider or a different content provider. In a related embodiment, a notification includes the first content item and the second content item to allow the content provider to view both content items simultaneously.

Each content item is associated with content provider identification data, either directly or indirectly. In generating a notification, content delivery system 120 uses the content provider identification data (associated with a content item that is determined to be similar "enough" (e.g., where a similarity value is above a certain threshold) to another content item) to identify the proper content provider and send the notification to that content provider.

A notification may be part of an email message addressed to a representative of a content provider, a text message addressed to the representative, and/or a (e.g., HTTP) message that includes an IP address or a web domain associated with the content provider.

In an embodiment, a notification to a content provider about a content item that is deemed similar to another content item is performed in real-time or near real-time. For example, in response to receiving text and/or an image of a particular content item, content delivery system 120 generates a hash value, looks up a bucket associated with the hash value, generates similarity scores between the particular content item and content items assigned to the bucket, and identifies any content items that are sufficiently similar to the particular content item (e.g., have a similarity score above a certain threshold).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
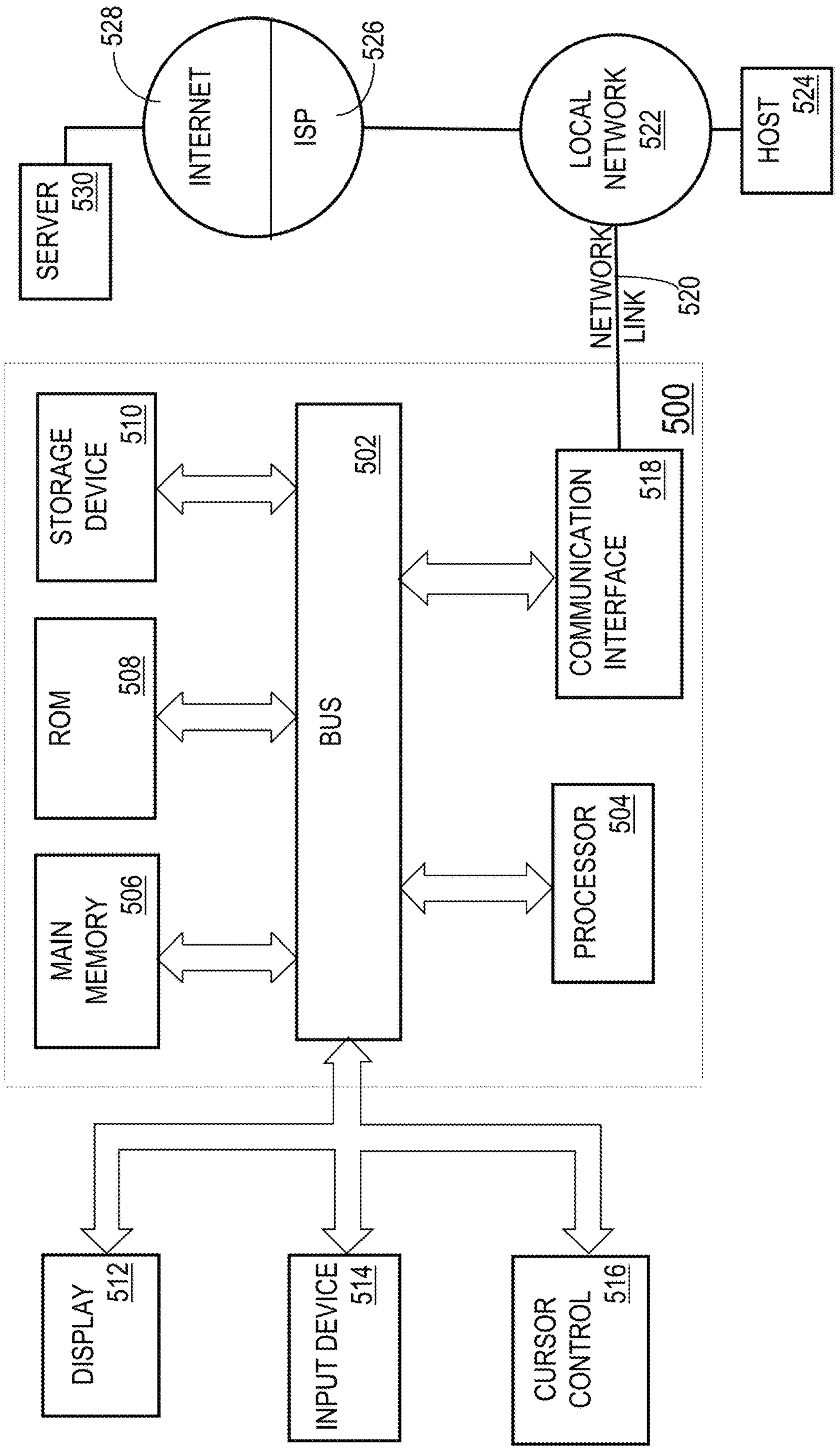
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to one or more output devices 512 such as a display device. Output device 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

for each content item of a plurality of content items:
generating a vector for said each content item;
without considering a vector of any content item other than said each content item, using the vector of said each content item to assign said each content item to a group of a plurality of groups that comprises more than two groups;
identifying a set of content items that are assigned to a particular group of the plurality of groups;
for each pair of content items in the set of content items:
generating a similarity score for said each pair of content items;
based on the similarity score, determining whether to classify said each pair of content items as similar to each other;
updating similarity data to identify said each pair of content items if it is determined to classify said each pair of content items as similar to each other;
wherein the similarity data associates a first content item with a second content item;
based on the similarity data, preventing the second content item from being presented to a particular user for a period of time after the first content item is presented to the particular user;
wherein the method is performed by one or more computing devices.

2. The method of claim 1, wherein using the vector comprises:

for each content item of the plurality of content items:
generating a hash value based on the vector generated for said each content item;
based on the hash value, identifying a bucket that is associated with the hash value;
assigning said each content item to the bucket.

3. The method of claim 1, further comprising, prior to preventing:

causing the first content item to be presented to the particular user;
receiving input, from a computing device of the particular user, that indicates a preference that the particular user does not wish to see content items that are similar to the first content item;
in response to receiving the input, identifying the second content item.

4. The method of claim 1, further comprising:

storing time data that indicates a length of time in which to prevent similar content items from being presented to the same user;
wherein the length of time is equal to the period of time.

5. The method of claim 1, wherein the similarity data associates a third content item with a fourth content item, further comprising:

based on the similarity data, determining that the fourth content item is similar to the third content item;
in response to determining that the fourth content item is similar to the third content item:
identifying a content provider that provided the fourth content item;
generating a notification that identifies the fourth content item;
causing the notification to be sent to a computing device associated with the content provider.

6. The method of claim 1, further comprising:

determining that a first content provider that provided the first content item is different than a second content provider that provided the second content item;
based on a particular similar score between the first content item and the second content item and determining that the first content provider is different than the second content provider, determining that the second content item represents potential fraud;
in response to determining that the second content item represents potential fraud, generating notification data that identifies the second content provider.

7. The method of claim 1, wherein the similarity data associates a third content item with a fourth content item, further comprising:

based on the similarity data, determining first performance data that is associated with the third content item;

estimating performance of the fourth content item based on the first performance data.

8. The method of claim 1, further comprising:

training a vector-generating model based on a text corpus;

for each content item of the plurality of content items:

inputting text from said each content item into the vector-generating model to generate a plurality of text vectors for said each content item;

generating a content item vector for said each content item based on the plurality of text vectors, wherein the vector for said each content item includes the content item vector.

9. The method of claim 8, further comprising:

for each content item of the plurality of content items:

inputting an image from said each content item into a vector-generating model to generate an image vector for said each content item;

wherein generating the similarity score comprises:

generating a single similarity score for said each pair of content items based on a combination of content item vector and image vector; or generating two similarity scores for said each pair of content items, one similarity score based on pairs of content item vectors and the other similarity score based on pairs of image vectors.

10. The method of claim 1, further comprising:

for each content item of the plurality of content items:

inputting an image from said each content item into a vector-generating model to generate an image vector for said each content item, wherein the vector for said each content item includes the image vector.

11. A method comprising:

for each content item of a plurality of content items:

generating a vector for said each content item;

generating a hash value based on the vector;

based on the hash value and without considering a vector or hash value of any content item other than said each content item, assigning said each content item to a bucket of a plurality of buckets that comprises more than two buckets;

identifying a set of content items that are assigned to a particular bucket of the plurality of buckets;

for each pair of content items in the set of content items:

generating a similarity score for said each pair of content items based on a pair of vectors associated with the pair of content items;

based on the similarity score, determining whether to classify said each pair of content items as similar to each other;

updating similarity data to identify said each pair of content items if it is determined to classify said each pair of content items as similar to each other;

wherein the method is performed by one or more computing devices.

12. One or more storage media storing instructions which, when executed by one or more processors, cause:

for each content item of a plurality of content items:

generating a vector for said each content item;

without considering a vector of any content item other than said each content item, using the vector of said each content item to assign said each content item to a group of a plurality of groups that comprises more than two groups;

identifying a set of content items that are assigned to a particular group of the plurality of groups;

for each pair of content items in the set of content items:

generating a similarity score for said each pair of content items;

based on the similarity score, determining whether to classify said each pair of content items as similar to each other;

updating similarity data to identify said each pair of content items if it is determined to classify said each pair of content items as similar to each other;

wherein the similarity data associates a first content item with a second content item;

based on the similarity data, preventing the second content item from being presented to a particular user for a period of time after the first content item is presented to the particular user.

13. The one or more storage media of claim 12, wherein using the vector comprises:

for each content item of the plurality of content items:

generating a hash value based on the vector generated for said each content item;

based on the hash value, identifying a bucket that is associated with the hash value;

assigning said each content item to the bucket.

14. The one or more storage media of claim 12, wherein the instructions, when executed by the one or more processors, further cause, prior to preventing:

causing the first content item to be presented to the particular user;

receiving input, from a computing device of the particular user, that indicates a preference that the particular user does not wish to see content items that are similar to the first content item;

in response to receiving the input, identifying the second content item.

15. The one or more storage media of claim 12, wherein the instructions, when executed by the one or more processors, further cause:

storing time data that indicates a length of time in which to prevent similar content items from being presented to the same user;

wherein the length of time is equal to the period of time.

16. The one or more storage media of claim 12, wherein the similarity data associates a third content item with a fourth content item, wherein the instructions, when executed by the one or more processors, further cause:

based on the similarity data, determining that the fourth content item is similar to the third content item;

in response to determining that the fourth content item is similar to the third content item:

identifying a content provider that provided the fourth content item;

generating a notification that identifies the fourth content item;

causing the notification to be sent to a computing device associated with the content provider.

17. The one or more storage media of claim 12, wherein the instructions, when executed by the one or more processors, further cause:

determining that a first content provider that provided the first content item is different than a second content provider that provided the second content item;

based on a particular similar score between the first content item and the second content item and determining that the first content provider is different than the second content provider, determining that the second content item represents potential fraud;

in response to determining that the second content item represents potential fraud, generating notification data that identifies the second content provider.

18. The one or more storage media of claim 12, wherein the similarity data associates a third content item with a fourth content item, wherein the instructions, when executed by the one or more processors, further cause:

based on the similarity data, determining first performance data that is associated with the third content item;

estimating performance of the fourth content item based on the first performance data.

19. The one or more storage media of claim 12, wherein the instructions, when executed by the one or more processors, further cause:

training a vector-generating model based on a text corpus;

for each content item of the plurality of content items:

inputting text from said each content item into the vector-generating model to generate a plurality of text vectors for said each content item;

generating a content item vector for said each content item based on the plurality of text vectors, wherein the vector for said each content item includes the content item vector.

20. The one or more storage media of claim 19, wherein the instructions, when executed by the one or more processors, further cause:

for each content item of the plurality of content items:

inputting an image from said each content item into a vector-generating model to generate an image vector for said each content item;

wherein generating the similarity score comprises:

generating a single similarity score for said each pair of content items based on a combination of content item vector and image vector; or generating two similarity scores for said each pair of content items, one similarity score based on pairs of content item vectors and the other similarity score based on pairs of image vectors.

* * * * *